United States Patent
Bishop

(10) Patent No.: US 10,588,273 B1
(45) Date of Patent: Mar. 17, 2020

(54) FLOOD IRRIGATION APPARATUS

(71) Applicant: Joshua Bishop, Coolidge, AZ (US)

(72) Inventor: Joshua Bishop, Coolidge, AZ (US)

(*) Notice: Subject to any disclaimer, the term of this patent is extended or adjusted under 35 U.S.C. 154(b) by 0 days.

(21) Appl. No.: 16/392,808

(22) Filed: Apr. 24, 2019

(51) Int. Cl.
*E02B 13/02* (2006.01)
*A01G 25/00* (2006.01)
*B01D 21/00* (2006.01)
*E02B 13/00* (2006.01)

(52) U.S. Cl.
CPC ......... *A01G 25/00* (2013.01); *B01D 21/0042* (2013.01); *E02B 13/00* (2013.01)

(58) Field of Classification Search
CPC ......... E02B 13/02; E02B 13/00; A01G 25/00; B01D 21/0042
See application file for complete search history.

(56) References Cited

U.S. PATENT DOCUMENTS

| 973,022 | A | * | 10/1910 | Fitzpatrick | E02B 13/00 405/40 |
| 2,854,823 | A | * | 10/1958 | Fisher | E02B 13/02 405/125 |
| 3,161,026 | A | * | 12/1964 | Smedley | E02B 3/02 405/35 |
| 3,429,125 | A | * | 2/1969 | Shotton | E02B 13/00 405/45 |
| 4,000,620 | A | * | 1/1977 | Burge | E02B 13/00 405/43 |
| 4,464,079 | A | * | 8/1984 | Chance | E02B 13/00 405/36 |
| 4,685,828 | A | * | 8/1987 | Whittle | E02B 13/02 251/147 |
| 6,076,994 | A | | 6/2000 | Brockway | |
| 8,474,327 | B2 | * | 7/2013 | Aughton | E02B 7/26 73/861.28 |
| 10,039,242 | B1 | * | 8/2018 | Goldwasser | A01G 22/00 |
| 2002/0066484 | A1 | * | 6/2002 | Stringam | A01G 25/16 137/392 |
| 2011/0008105 | A1 | * | 1/2011 | Soergel | A01G 25/02 405/43 |
| 2012/0029709 | A1 | * | 2/2012 | Safreno | A01G 25/16 700/284 |
| 2012/0275863 | A1 | * | 11/2012 | Goldwasser | E02B 7/28 405/103 |
| 2013/0112007 | A1 | * | 5/2013 | Adler | G01F 1/00 73/861.08 |

(Continued)

*Primary Examiner* — Benjamin F Fiorello
(74) *Attorney, Agent, or Firm* — Sanchelima & Associates, P.A.; Christian Sanchelima; Jesus Sanchelima

(57) ABSTRACT

The present invention relates to a flood irrigation apparatus. The apparatus comprises a headgate in communication with a body of water. The body of water can be a pond or a reservoir, for example. The apparatus further comprises a conduit securely connected to the headgate and in fluid communication with the headgate, wherein the flow of water within the conduit is regulated by the operation of the headgate. The apparatus further comprises an exit chamber securely connected to the conduit and in fluid communication with the conduit. The exit chamber comprises a plurality of vertical bricks disposed on the floor of the exit chamber. The vertical bricks facilitate the trapping of the silt and debris on the floor of the exit chamber in order to provide substantially silt-free water for irrigation.

4 Claims, 5 Drawing Sheets

(56) References Cited

U.S. PATENT DOCUMENTS

| | | | |
|---|---|---|---|
| 2013/0315670 A1* | 11/2013 | Haire | E02B 7/20 |
| | | | 405/125 |
| 2015/0211647 A1* | 7/2015 | Tomasko | F16K 17/1606 |
| | | | 137/68.19 |
| 2017/0051855 A1* | 2/2017 | Munetomo | F16L 23/036 |
| 2017/0314221 A1* | 11/2017 | Watson | E02B 7/34 |

* cited by examiner

FLOOD IRRIGATION APPARATUS

BACKGROUND OF THE INVENTION

1. Field of the Invention

The present disclosure relates to the field of irrigation. In particular, the present disclosure relates to an apparatus for regulating flood irrigation.

2. Description of the Related Art

Flood irrigation is a type of irrigation where water is applied and distributed over the soil surface by gravity. It is one of the most commonly used form of irrigation around the globe. A problem, however, is that the water being used for flood irrigation should be free of silt and debris such as leaves, twigs, and the like, so as not to impede or harm the growth of the crop or plant being irrigated.

Several designs for flood irrigation systems been designed in the past. None of them, however, are known to facilitate a provision of substantially silt-free water for irrigation while at the same time having a simple and an easy to operate configuration.

Applicant believes that a related reference corresponds to U.S. Pat. No. 6,076,994 filed by DAVID C. BROCKWAY. The Brockway reference discloses an apparatus for providing water from a lake, pond, or other body of water, relatively silt and sediment free. A water inlet is positioned off the bottom of the body of water and is adjustably supported from the bottom of the body of water. The inlet is maintained above the silt and sediment layer at the bottom of the body of water and below the surface layer of the body of water. However, the apparatus disclosed in the Brockway reference has a complicated working and configuration.

Applicant believes that another related reference corresponds to U.S. Patent Publication No. 20100243547 filed by DONALD JUSTICE. The Justice reference discloses a system for reuse of water stored in a reservoir by transfer of initially filtered water from the reservoir to a vertically stacked filtration system located onshore. However, the system disclosed in the Justice reference has a complicated working and configuration.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a flood irrigation apparatus configured for providing substantially silt free water for irrigation.

It is yet another object of the present invention to provide a flood irrigation apparatus having a simple and an easy to operate configuration.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
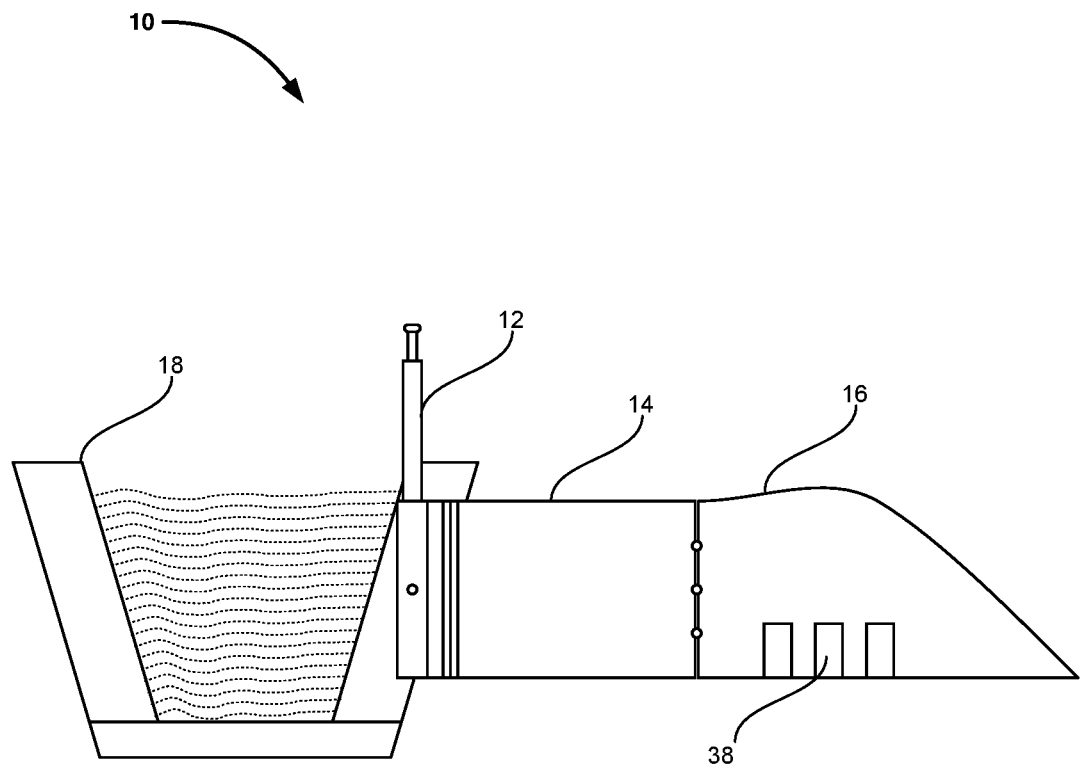
FIG. 1 illustrates a schematic view of a flood irrigation apparatus 10, in accordance with an embodiment of the present invention, wherein the flood irrigation apparatus 10 comprises a headgate 12, a conduit 14 securely connected to the headgate 12 and in fluid communication with the headgate 12, and an exit chamber 16 securely connected to the conduit 14 and in fluid communication with the conduit 14.
Figure 2:
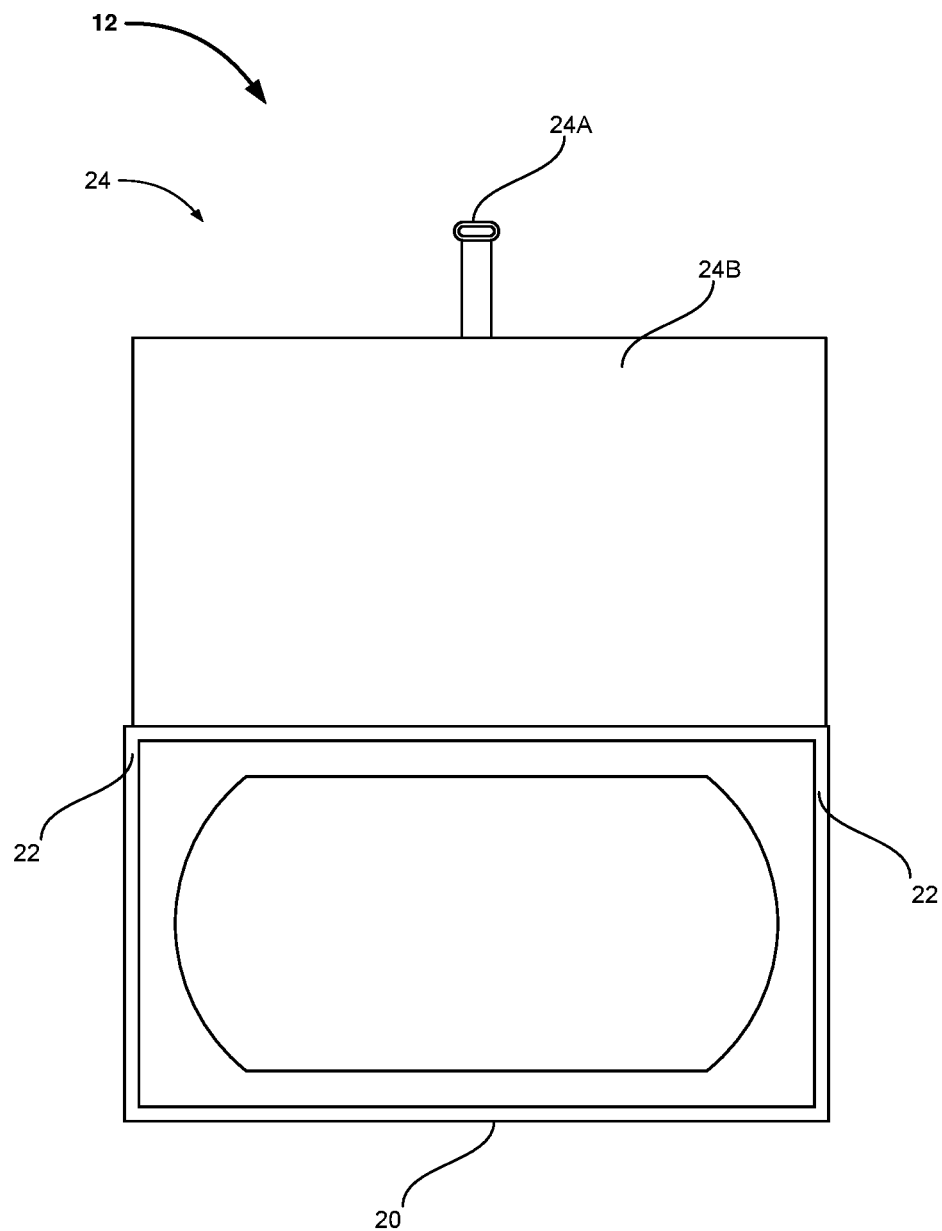
FIG. 2 illustrates a front view of the headgate 12 of the apparatus 10, in accordance with an embodiment of the present invention.
Figure 3:
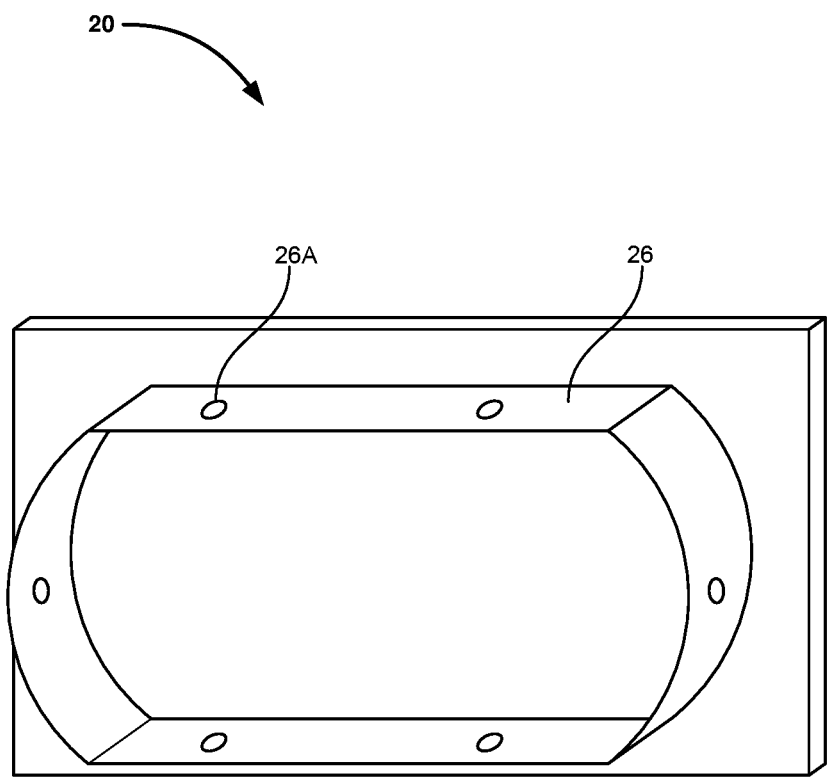
FIG. 3 illustrates a perspective view of a frame 20, of the headgate 12, having a first connector flange 26 extending therefrom, in accordance with an embodiment of the present invention.
Figure 5:
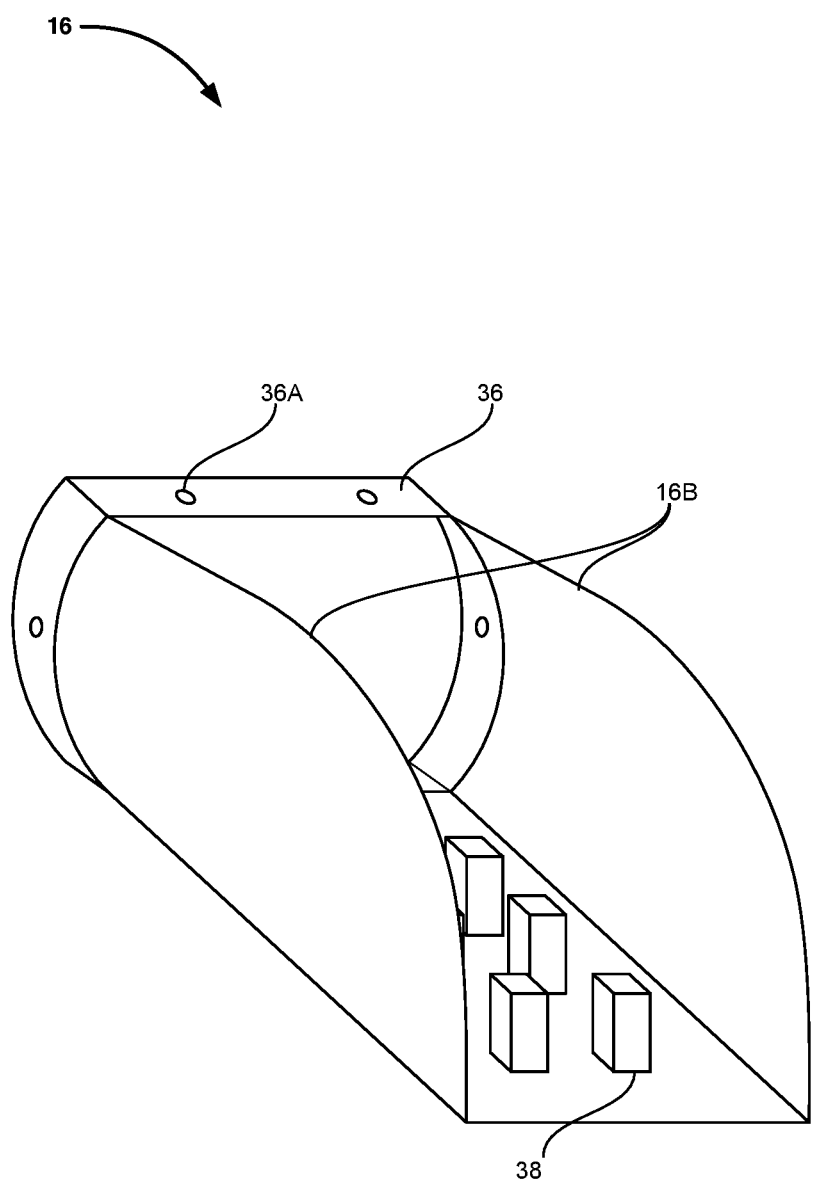
FIG. 5 illustrates a perspective view of the exit chamber 16 of the apparatus 10, in accordance with an embodiment of the present invention.

Referring now to FIGS. 1 and 5, where the present invention is generally referred to with numeral 10, it can be observed that a flood irrigation apparatus 10, in accordance with an embodiment of the present invention, comprises a headgate 12, a conduit 14 securely connected to the headgate 12 and in fluid communication with the headgate 12, and an exit chamber 16 securely connected to the conduit 14 and in fluid communication with the conduit 14.

The flood irrigation apparatus 10 comprises a headgate 12. The headgate 12 is the component of the flood irrigation apparatus 10 that facilitates the regulation of the water supply from a body of water 18. The body of water 18 can be a lake, a pond, or any other artificial or natural body of water.

The headgate 12 comprises a frame 20. The frame 20 can be made of any suitable material per the application requirements. In one embodiment, the frame 20 has a rectangular configuration. However, the frame 20 is not restricted to being rectangular, and other configurations, for example, circular, triangular, elliptical, and the like are well within the ambit of the present invention.

The headgate 12 further comprises rails 22 configured on or integral to the frame 20. In the present embodiment, the rails 22 are configured on the lateral edges of the frame 20. The headgate 12 further comprises a gate 24 slidable within the rails 22, wherein the gate 24 comprises a gate portion 24A, and a handle rod 24B extending from the gate portion 24A.

In one embodiment, the handle rod 24B is threadably coupled to the gate portion 24A, wherein the rotation of the handle rod 24B facilitates the lifting and lowering of the gate portion 24A within the rails 22. The lifting and lowering of the gate portion 24A regulates the fluid communication between the body of water 18 and the flood irrigation apparatus 10. The gate portion 24A is lifted when the supply of water thru the flood irrigation apparatus 10 is desired. The handle rod 24B can be rotated manually or via mechanical assistance, for example, via a motor. The motor (not shown in figures) can be manually operable or can be configured for remote operation.

In another embodiment, the handle rod 24B has a telescopic configuration. The telescopic configuration can be facilitated by a hydraulic cylinder, a pneumatic cylinder, or a rack and pinion arrangement. In such a configuration, the gate portion 24A is securely connected to the handle rod 24B having the telescopic configuration, and the lifting and lowering of the gate portion 24A is facilitated by the telescopic movement of the handle rod 24B.

The headgate 12 further comprises a first connector flange 26 extending from the frame 20 and having a plurality of apertures 26A configured thereon. The first connector flange 26 of the headgate 12 is the portion of the headgate 12 that connects to the conduit 14 of the flood irrigation apparatus 10.

The flood irrigation apparatus 10 further comprises the conduit 14 securely connected to the headgate 12 and in fluid communication with the headgate 12, wherein the conduit 14 includes a flexible portion and a coupling means 28 provided at operative ends of the conduit 14. The coupling means 28 connects with the first connector flange 26 of the headgate 12 to facilitate the coupling of the conduit 14 with the headgate 12.

Figure 4:
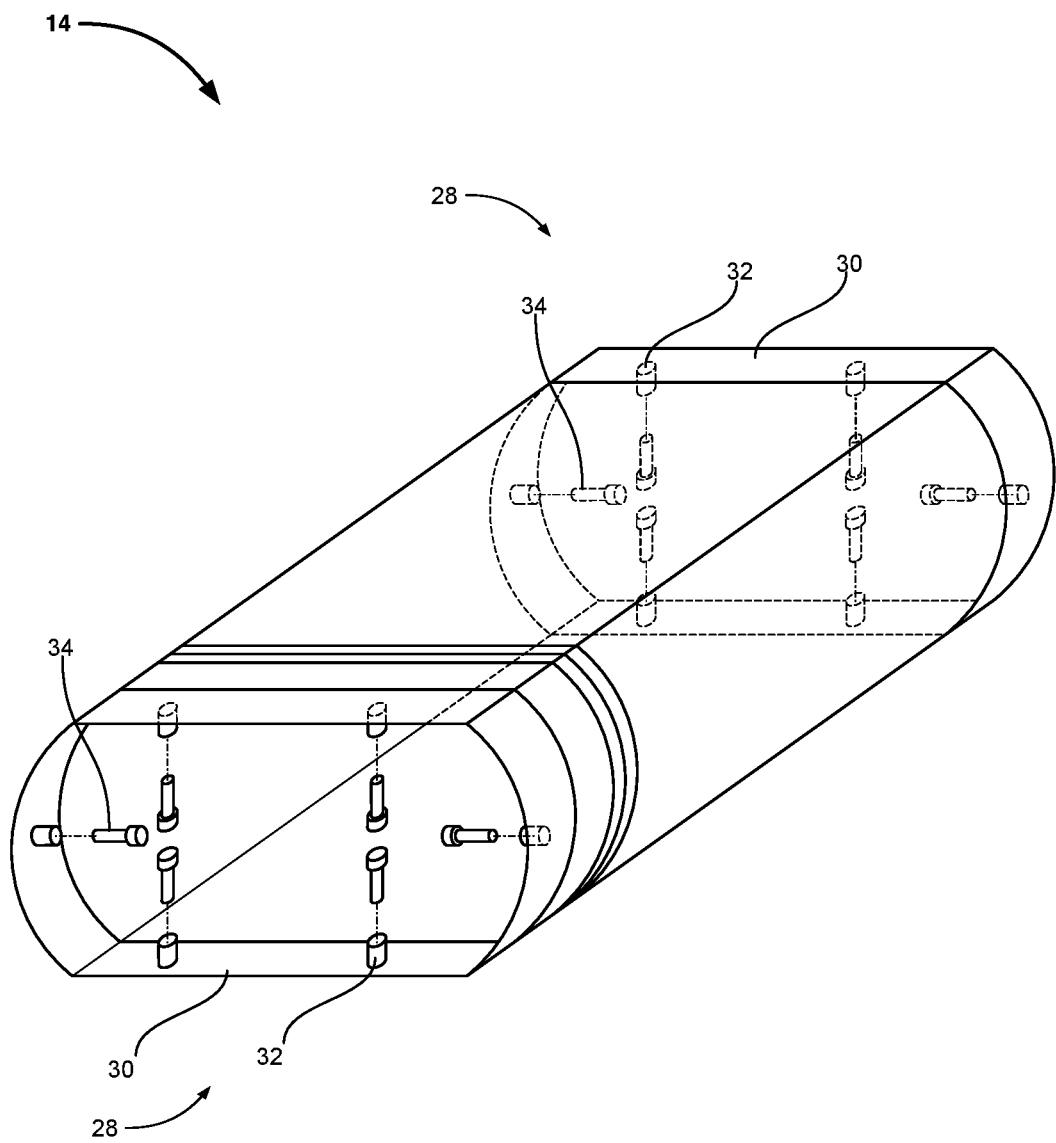
FIG. 4 illustrates a perspective view of the conduit 14 of the apparatus 10, in accordance with an embodiment of the present invention.

The coupling means 28 includes a connector plate 30 extending along a periphery of an opening of the conduit 14 provided at each operative end of the conduit 14, as seen in FIG. 4. At least one protrusion 32 extends from each of the connector plate 30, wherein at least one operative end of the conduit 14 and the protrusions 32 are configured to register with the plurality of apertures 26A configured on the first connector flange 26 of the headgate 12. The protrusions 32 are hollow and provided with internal threads configured to receive the screws 34. More specifically, the protrusions 32 are received within the plurality of apertures 26A, subsequent to which the screws 34 are assembled into the protrusions 32 for securing the conduit 14 to the headgate 12.

The flood irrigation apparatus 10 further comprises an exit chamber 16. The exit chamber 16 is securely connected to the conduit 14 and in fluid communication with the conduit 14. The exit chamber 16 is defined by a floor 16A and sidewalls 16B extending from the longitudinal edges of the floor 16A. The exit chamber 16 includes a second connector flange 36 having apertures 36A. The apertures 36A are configured to register with the protrusions 32 provided on the conduit 14 at the end of the conduit 14 connectable to the second connector flange 36 of the exit chamber 16. The connection of the exit chamber 16 with the conduit 14 is similar to the connection of the conduit 14 with the headgate 12, and facilitated by the screws 34. As such, the description of the connection is not repeated again for the sake of brevity of the present disclosure.

The exit chamber 16 further comprises a plurality of vertical bricks 38 disposed on the floor 16A of the exit chamber. The vertical bricks 38 facilitate the trapping of the silt and debris on the floor 16A of the exit chamber 16 to provide substantially silt-free water for irrigation.

The supply of the water from the body of water 18 into the flood irrigation apparatus 10 is regulated by the headgate 12. When the headgate 12 is operated and the gate portion 24A is lifted, water from the body of water 18 enters the conduit 14 and the exit chamber 16. At the exit chamber 16, the vertical bricks facilitate the provision of substantially silt-free water for irrigation purposes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A flood irrigation apparatus comprising:
    a. a headgate in communication with a body of water, wherein said headgate comprises a frame, rails configured on or integral to said frame, a gate slidable within said rails, wherein said gate comprises a gate portion, and a handle rod extending from said gate portion, wherein said handle rod is threadably coupled to said gate portion, wherein the rotation of said handle rod facilitates the lifting and lowering of said gate portion within said rails and a first connector flange extending from said frame and having a plurality of apertures configured thereon;
    b. a conduit securely connected to said headgate and in fluid communication with said headgate, wherein said conduit includes a flexible portion, and wherein said conduit includes coupling means provided at operative ends thereof and said coupling means include a connector plate extending along a periphery of an opening of said conduit and at least one protrusion extending from said connector plate, wherein said at least one protrusion is configured to register with said plurality of apertures configured on said first connector flange of said headgate, wherein said at least one protrusion is hollow and has internal threads configured thereon for receiving a fastener therein for securing said conduit to said first connector flange of said headgate and an exit chamber securely connected to said conduit and in fluid communication with said conduit, wherein said exit chamber includes a second connector flange having apertures and a plurality of vertical bricks disposed on a floor of said exit chamber.

2. The apparatus according to claim 1, wherein said handle rod is telescopic.

3. The apparatus of claim 1, wherein the frame has a rectangular configuration.

4. The apparatus of claim 1, wherein the handle rod is rotated manually or via mechanical assistance.

* * * * *